(12) United States Patent
Wang

(10) Patent No.: US 10,984,417 B2
(45) Date of Patent: Apr. 20, 2021

(54) BLOCKCHAIN-BASED DATA SYNCHRONIZATION SYSTEM, METHOD, APPARATUS, AND ELECTRONIC DEVICE

(71) Applicant: ADVANCED NEW TECHNOLOGIES CO., LTD., Grand Cayman (KY)

(72) Inventor: Shiyu Wang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/877,362

(22) Filed: May 18, 2020

(65) Prior Publication Data
US 2020/0279262 A1 Sep. 3, 2020

Related U.S. Application Data

(63) Continuation of application No. PCT/CN2020/071366, filed on Jan. 10, 2020.

(30) Foreign Application Priority Data

Apr. 25, 2019 (CN) .......................... 201910340287.5

(51) Int. Cl.
G06Q 20/40 (2012.01)
G06Q 40/02 (2012.01)
(Continued)

(52) U.S. Cl.
CPC ....... G06Q 20/401 (2013.01); G06F 16/2379 (2019.01); G06F 16/273 (2019.01);
(Continued)

(58) Field of Classification Search
CPC ...... G06Q 20/40; G06Q 40/06; G06Q 20/207; G06Q 20/102; G06Q 20/223; G06Q 20/36
See application file for complete search history.

(56) References Cited

U.S. PATENT DOCUMENTS 7,110,980 B2  9/2006  Almonte et al.
7,716,128 B2  5/2010  Diveley et al.
(Continued)

FOREIGN PATENT DOCUMENTS

CA    3030440 A1    1/2018
CN    106850200 A    6/2017
(Continued)

OTHER PUBLICATIONS

Antonopoulos, "Mastering Bitcoin", 2014 (Year: 2014).*
(Continued)

Primary Examiner — Johann Y Choo

(57) ABSTRACT

Methods, systems, and apparatus, including computer programs encoded on computer storage media, for blockchain-based data synchronization are provided. One of the methods includes: receiving, a transaction order created based on a transaction record; storing, the transaction order in association with the blockchain upon confirming the transaction order; receiving, a payment order created based on a payment record; storing, the payment order in association with the blockchain upon confirming the payment order; receiving, a fund transfer corresponding to the payment order; verifying, an amount of the fund transfer is consistent with the amount paid by the payer to the payee through the payment node; performing, a split-settlement operation on the payee based on the amount paid by the payer to the payee through the payment node; creating, a split-settlement record based on the split-settlement operation; and upload- (Continued)

ing, the split-settlement record for confirmation by the transaction node and the payment node.

20 Claims, 6 Drawing Sheets

(51) Int. Cl.
  *G06Q 20/10* (2012.01)
  *G06Q 20/38* (2012.01)
  *G06F 16/27* (2019.01)
  *G06F 16/23* (2019.01)
  *G06F 21/64* (2013.01)
  *H04L 9/32* (2006.01)

(52) U.S. Cl.
  CPC .......... *G06F 21/64* (2013.01); *G06Q 20/108* (2013.01); *G06Q 20/3825* (2013.01); *G06Q 20/3827* (2013.01); *G06Q 20/3829* (2013.01); *G06Q 40/02* (2013.01); *H04L 9/3242* (2013.01); *H04L 9/3247* (2013.01); *G06Q 2220/00* (2013.01)

(56) References Cited

U.S. PATENT DOCUMENTS

| | | | |
|---|---|---|---|
| 8,744,921 | B2 | 6/2014 | Butler |
| 8,831,980 | B2 | 9/2014 | Antoo et al. |
| 10,541,821 | B2 | 1/2020 | Toll et al. |
| 2005/0080748 | A1* | 4/2005 | Belobaba ............ G06Q 20/367 705/65 |
| 2014/0344044 | A1 | 11/2014 | Sprogoe et al. |
| 2015/0142546 | A1* | 5/2015 | Powell .................. G06Q 20/40 705/14.23 |
| 2015/0161599 | A1* | 6/2015 | Sass ...................... G06Q 40/02 705/39 |
| 2017/0017958 | A1 | 1/2017 | Scott et al. |
| 2017/0178128 | A1 | 6/2017 | Fourez et al. |
| 2017/0236104 | A1 | 8/2017 | Biton |
| 2017/0330181 | A1 | 11/2017 | Ortiz |
| 2017/0372278 | A1 | 12/2017 | Frolov et al. |
| 2017/0372417 | A1 | 12/2017 | Gaddam et al. |
| 2018/0053160 | A1 | 2/2018 | Schwartz et al. |
| 2018/0268382 | A1 | 9/2018 | Wasserman |
| 2018/0268401 | A1 | 9/2018 | Ortiz et al. |
| 2020/0074460 | A1 | 3/2020 | Tapang |

FOREIGN PATENT DOCUMENTS

| | | |
|---|---|---|
| CN | 107194798 A | 9/2017 |
| CN | 107341729 A | 11/2017 |
| CN | 107358417 A | 11/2017 |
| CN | 108717629 A | 10/2018 |
| CN | 109241778 A | 1/2019 |
| CN | 109523267 A | 3/2019 |
| CN | 109543869 A | 3/2019 |
| CN | 109636597 A | 4/2019 |
| CN | 110188138 A | 8/2019 |
| WO | 2003/067535 A1 | 8/2003 |

OTHER PUBLICATIONS

Yafimava, "Consortium Blockchain", 2019 (Year: 2019).*
First Search dated May 19, 2020, issued in related Chinese Application No. 201910340287.5 (2 pages).
First Office Action dated May 28, 2020, issued in related Chinese Application No. 201910340287.5, with English machine translation (30 pages).
Supplementary Search dated Jul. 8, 2020, issued in related Chinese Application No. 201910340287.5 (1 page).
Written Opinion and International Search Report for PCT Application No. PCT/CN2020/071366 made available to public on Oct. 29, 2020.

* cited by examiner ns, the embodi-
BLOCKCHAIN-BASED DATA SYNCHRONIZATION SYSTEM, METHOD, APPARATUS, AND ELECTRONIC DEVICE

CROSS-REFERENCE TO RELATED APPLICATION

The specification is a continuation application of International Patent Application No. PCT/CN2020/071366, filed with the China National Intellectual Property Administration (CNIPA) on Jan. 10, 2020, which is based on and claims priority to and benefit of Chinese Patent Application No. 201910340287.5, filed with the CNIPA on Apr. 25, 2019. The entire contents of all of the above-identified applications are incorporated herein by reference.

TECHNICAL FIELD

The specification relates to the field of computer technologies, and in particular, to an consortium-blockchain-based data synchronization system, method, storage medium, apparatus, and an electronic device.

BACKGROUND

With the rapid development of technologies, such as mobile Internet, cloud computing, and big data, online cardless payment platforms become popular rapidly. The online cardless payment platforms are usually payment platforms that are actually engaged in payment services as supported by licensed acquirers without a payment business license from the central banks. When a merchant entrusts such payment platforms to conduct a transaction, some payment platforms usually directly post a settled fund to an account of the merchant, this may cause a problem of secondary clearing of the fund.

At present, to avoid the problem of secondary clearing of the fund, an independent software vendor (ISV) usually chooses to open a sub-account in a bank depository system for performing account settlement and split-settlement operations for the merchant. Specifically, the ISV may acquire a payment through a payment system of a third-party payment company. The third-party payment company credits the acquired fund to the depositary bank, and the depositary bank then performs account split-settlement operations for the merchant based on a reconciliation statement provided by the third-party payment company and an account splitting instruction issued by the ISV.

Although the above mode avoids the problem of secondary clearing of the fund, account split-settlement information relies on the account splitting instruction of the ISV and original data provided by the third-party payment company, and consequently the bank depository system performs account split-settlement for the merchant based on such account split-settlement information. Therefore, the existing settlement and account splitting mode still has the problem of secondary clearing of information.

SUMMARY

Embodiments of the specification provide a consortium-blockchain-based data synchronization system, method, storage medium, apparatus, and an electronic device to resolve a problem of secondary clearing of information in existing settlement and account splitting mode.

To resolve the above technical problems, the embodiments of the specification are implemented in the following way.

A first aspect provides an consortium-blockchain-based data synchronization system including a transaction node, a payment node, and an account split-settlement node. The transaction node creates a transaction order based on a transaction record, and uploads the transaction order to a consortium blockchain for the payment node and the account split-settlement node to confirm the transaction order. The payment node creates a payment order based on a payment record of a payer in the transaction order on the payment node, and uploads the payment order to the consortium blockchain for the transaction node and the account split-settlement node to confirm the payment order. The account split-settlement node performs an account split-settlement operation based on a fund transfer operation performed by the payment node on the account split-settlement node with respect to the payment order, creates an account split-settlement record based on the account split-settlement operation, and uploads the account split-settlement record to the consortium blockchain for the transaction node and the payment node to confirm the account split-settlement record.

A second aspect provides an consortium-blockchain-based data synchronization method. The method is implemented on a transaction node, and the method includes creating a transaction order based on a transaction record, and uploading the transaction order to a consortium blockchain for a payment node and an account split-settlement node to confirm the transaction order.

A third aspect provides an consortium-blockchain-based data synchronization method, wherein the method is implemented on a payment node. The method includes: creating a payment order based on a payment record of a payer in a transaction order on the payment node; and uploading the payment order to a consortium blockchain for a transaction node and an account split-settlement node to confirm the payment order, wherein the transaction order is uploaded by the transaction node to the consortium blockchain, and the transaction order has been confirmed by the payment node and the account split-settlement node.

A fourth aspect provides an consortium-blockchain-based data synchronization method, wherein the method is implemented on an account split-settlement node. The method includes: performing an account split-settlement operation based on a fund transfer operation performed by a payment node on the account split-settlement node with respect to a payment order; creating an account split-settlement record based on the account split-settlement operation; and uploading the account split-settlement record to an consortium blockchain for a transaction node and the payment node to confirm the account split-settlement record, wherein the payment order is uploaded by the payment node to the consortium blockchain, and the payment order has been confirmed by the transaction node and the account split-settlement node.

A fifth aspect provides a transaction node including: a transaction creation unit, configured to create a transaction order based on a transaction record; and a transaction uploading unit, configured to upload the transaction order to an a consortium blockchain for a payment node and an account split-settlement node to confirm the transaction order.

A sixth aspect provides a payment node including: a payment creation unit, configured to create a payment order based on a payment record; and a payment uploading unit, configured to upload the payment order to a consortium blockchain for a transaction node and an account split-settlement node to confirm the payment order.

A seventh aspect provides an account split-settlement node including: an account split-settlement unit, configured to perform an account split-settlement operation based on a fund transfer operation performed by a payment node on the account split-settlement node with respect to a payment order; a settlement creation unit, configured to create an account split-settlement record based on the account split-settlement operation; and a settlement uploading unit, configured to upload the account split-settlement record to a consortium blockchain for the transaction node and the payment node to confirm the account split-settlement record, wherein the payment order is uploaded by the payment node to the consortium blockchain, and the payment order has been confirmed by the transaction node and the account split-settlement node.

An eighth aspect provides an electronic device including a processor, and a memory arranged to store computer-executable instructions that, when executed, causes the processor to perform the following operations: creating a transaction order based on a transaction record; and uploading the transaction order to a consortium blockchain for a payment node and an account split-settlement node to confirm the transaction order.

A ninth aspect provides a computer-readable storage medium, wherein the computer-readable storage medium stores one or more programs that, when executed by an electronic device including a plurality of applications, cause the electronic device to perform the following operations: creating a transaction order based on a transaction record; and uploading the transaction order to a consortium blockchain for a payment node and an account split-settlement node to confirm the transaction order.

A tenth aspect provides an electronic device, including a processor, and a memory arranged to store computer-executable instructions that, when executed, causes the processor to perform the following operations: creating a payment order based on a payment record of a payer in a transaction order on the payment node; and uploading the payment order to a consortium blockchain for a transaction node and an account split-settlement node to confirm the payment order, wherein the transaction order is uploaded by the transaction node to the consortium blockchain, and the transaction order has been confirmed by the payment node and the account split-settlement node.

An eleventh aspect provides a computer-readable storage medium, wherein the computer-readable storage medium stores one or more programs that, when executed by an electronic device including a plurality of applications, cause the electronic device to perform the following operations: creating a payment order based on a payment record of a payer in a transaction order on the payment node; and uploading the payment order to a consortium blockchain for a transaction node and an account split-settlement node to confirm the payment order, wherein the transaction order is uploaded by the transaction node to the consortium blockchain, and the transaction order has been confirmed by the payment node and the account split-settlement node.

A twelfth aspect provides an electronic device including a processor and a memory arranged to store computer-executable instructions that, when executed, causes the processor to perform the following operations: performing an account split-settlement operation based on a fund transfer operation performed by a payment node on an account split-settlement node with respect to a payment order; creating an account split-settlement record based on the account split-settlement operation; and uploading the account split-settlement record to a consortium blockchain for the transaction node and the payment node to confirm the account split-settlement record, wherein the payment order is uploaded by the payment node to the consortium blockchain, and the payment order has been confirmed by the transaction node and the account split-settlement node.

A thirteenth aspect provides a computer-readable storage medium, wherein the computer-readable storage medium stores one or more programs that, when executed by an electronic device including a plurality of applications, cause the electronic device to perform the following operations: performing an account split-settlement operation based on a fund transfer operation performed by a payment node on an account split-settlement node with respect to a payment order; creating an account split-settlement record based on the account split-settlement operation; and uploading the account split-settlement record to a consortium blockchain for a transaction node and a payment node to confirm the account split-settlement record, wherein the payment order is uploaded by the payment node to the consortium blockchain, and the payment order has been confirmed by the transaction node and the account split-settlement node.

In a further aspect, a method for blockchain-based data synchronization in a blockchain is provided. The method comprises: receiving, a transaction order created based on a transaction record; storing, the transaction order in association with the blockchain upon confirming the transaction order; receiving, a payment order created based on a payment record; storing, the payment order in association with the blockchain upon confirming the payment order; receiving, a fund transfer corresponding to the payment order; verifying, an amount of the fund transfer is consistent with the amount paid by the payer to the payee through the payment node; performing, a split-settlement operation on the payee based on the amount paid by the payer to the payee through the payment node; creating, a split-settlement record based on the split-settlement operation; and uploading, the split-settlement record for confirmation by the transaction node and the payment node.

In an embodiment, the blockchain comprises a consortium blockchain.

In an embodiment, the method further comprises: creating, by the transaction node, the transaction order based on the transaction record; signing, by the transaction node, a digest of the transaction order using a private key of the transaction node to obtain a digital signature; and uploading, by the transaction node, the transaction order and the digital signature to the blockchain for confirmation by the payment node and the split-settlement node.

In an embodiment, the confirming the transaction order comprises: decrypting the digital signature using a public key of the transaction node to obtain a first digest; applying a hash function to the transaction order to obtain a second digest; and verifying that the transaction order is uploaded by the transaction node to the blockchain if the first digest is consistent with the second digest.

In an embodiment, the method further comprises: creating, by the payment node, the payment order based on the payment record; signing, by the payment node, a digest of the payment order using a private key of the payment node to obtain a digital signature; and uploading, by the payment node, the payment order and the digital signature to the blockchain for confirmation by the transaction node and the split-settlement node.

In an embodiment, the confirming the payment order comprises: decrypting the digital signature using a public key of the payment node to obtain a first digest; applying a hash function to the payment order to obtain a second digest; and verifying that the payment order is uploaded by the payment node to the blockchain if the first digest is consistent with the second digest.

In an embodiment, the method further comprises: signing, by the split-settlement node, a digest of the split-settlement record using a private key of the split-settlement node to obtain a digital signature; and uploading, by the split-settlement node, the digital signature to the blockchain.

In an embodiment, the method further comprises: verifying, by the transaction node, the split-settlement record based on the digital signature; and verifying, by the payment node, the split-settlement record based on the digital signature.

In an embodiment, the plurality of blockchain nodes further comprises a regulatory node, and wherein the method further comprises confirming, by the regulatory node, at least one of the transaction order, the payment order, or the split-settlement record.

In another aspect, a system for blockchain-based data synchronization implemented in a blockchain is provided. The system comprises at least one processor and a non-transitory computer-readable storage medium storing instructions executable by the at least one processor to cause the system to perform operations. The operations comprise: receiving a transaction order created based on a transaction record via a computer network, wherein the blockchain has the computer network of a plurality of blockchain nodes comprising a transaction node, a payment node, and the split-settlement node, and the at least one processor comprises the first processor; storing, the transaction order in association with the blockchain upon confirming the transaction order; receiving, a payment order created based on a payment record; storing, the payment order in association with the blockchain upon confirming the payment order; receiving, a fund transfer corresponding to the payment order; verifying, an amount of the fund transfer is consistent with the amount paid by the payer to the payee through the payment node; performing, a split-settlement operation on the payee based on the amount paid by the payer to the payee through the payment node; creating, a split-settlement record based on the split-settlement operation; and uploading, the split-settlement record for confirmation by the transaction node and the payment node.

In another aspect, a non-transitory computer-readable storage medium for blockchain-based data synchronization implemented in a blockchain is provided. The medium is configured with instructions executable by one or more processors to cause the one or more processors to perform operations. The operations comprise: receiving a transaction order created based on a transaction record via a computer network, wherein the blockchain has the computer network of a plurality of blockchain nodes comprising a transaction node, a payment node, and the split-settlement node, and the at least one processor comprises the first processor; storing, the transaction order in association with the blockchain upon confirming the transaction order; receiving, a payment order created based on a payment record; storing, the payment order in association with the blockchain upon confirming the payment order; receiving, a fund transfer corresponding to the payment order; verifying, an amount of the fund transfer is consistent with the amount paid by the payer to the payee through the payment node; performing, a split-settlement operation on the payee based on the amount paid by the payer to the payee through the payment node; creating, a split-settlement record based on the split-settlement operation; and uploading, the split-settlement record for confirmation by the transaction node and the payment node.

The embodiments of the specification can achieve at least the following technical effects using the foregoing technical solutions. After creating a transaction order based on a transaction record, the transaction node may upload the transaction order to a consortium blockchain for other nodes in the consortium blockchain to confirm the transaction order, thereby synchronizing the transaction order among all nodes in the consortium blockchain. After creating a payment order based on a payment record, the payment node may upload the payment order to the consortium blockchain for other nodes in the consortium blockchain to confirm the payment order, thereby synchronizing the payment order among all nodes in the consortium blockchain. After performing an account split-settlement operation, the account split-settlement node can create an account split-settlement record based on the account split-settlement operation, and upload the account split-settlement record to the consortium blockchain for other nodes in the consortium blockchain to confirm the account split-settlement record, thereby synchronizing the account split-settlement record among all nodes in the consortium blockchain.

Taking the advantage of the characteristic that information in the consortium blockchain is unfalsifiable, the transaction order, the payment order, and the account split-settlement record are all uploaded to the consortium blockchain. After being confirmed by other nodes than the uploading node in the consortium blockchain, the data is synchronized, thereby preventing falsification of original data in the process of transaction and account split-settlement.

BRIEF DESCRIPTION OF THE DRAWINGS

The accompanying drawings described herein are used for providing further understanding for the specification and constitute a part of the specification. Embodiments of the specification and descriptions thereof are used for explaining the specification and do not constitute any limitation to the specification.

DETAILED DESCRIPTION OF THE INVENTION

To make the objectives, technical solutions, and advantages of the specification clearer, the following description clearly and completely describes the technical solutions of the specification with reference to specific embodiments of the specification and the corresponding accompanying drawings. The described embodiments are only some embodiments rather than all the embodiments of the specification. All other embodiments obtained by a person of ordinary skill in the art based on the embodiments of the specification without creative efforts shall fall within the protection scope of the specification.

The technical solution provided by various embodiments of the specification will be described in detail below with reference to the accompanying drawings.

To resolve the problem of secondary clearing of information in the existing settlement and account splitting mode, the embodiments of the specification provide a consortium-blockchain-based data synchronization system. The secondary clearing of information generally means that, without involving a specific fund settlement step, an unlicensed institution, such as a third-party payment platform, dominates the provision of a merchant fund settlement statement due to the advantage of the grasp of original transaction data. The commercial banks and payment institutions use the fund settlement statement provided by the unlicensed institution as a basis for crediting the merchants' accounts.

Figure 1:
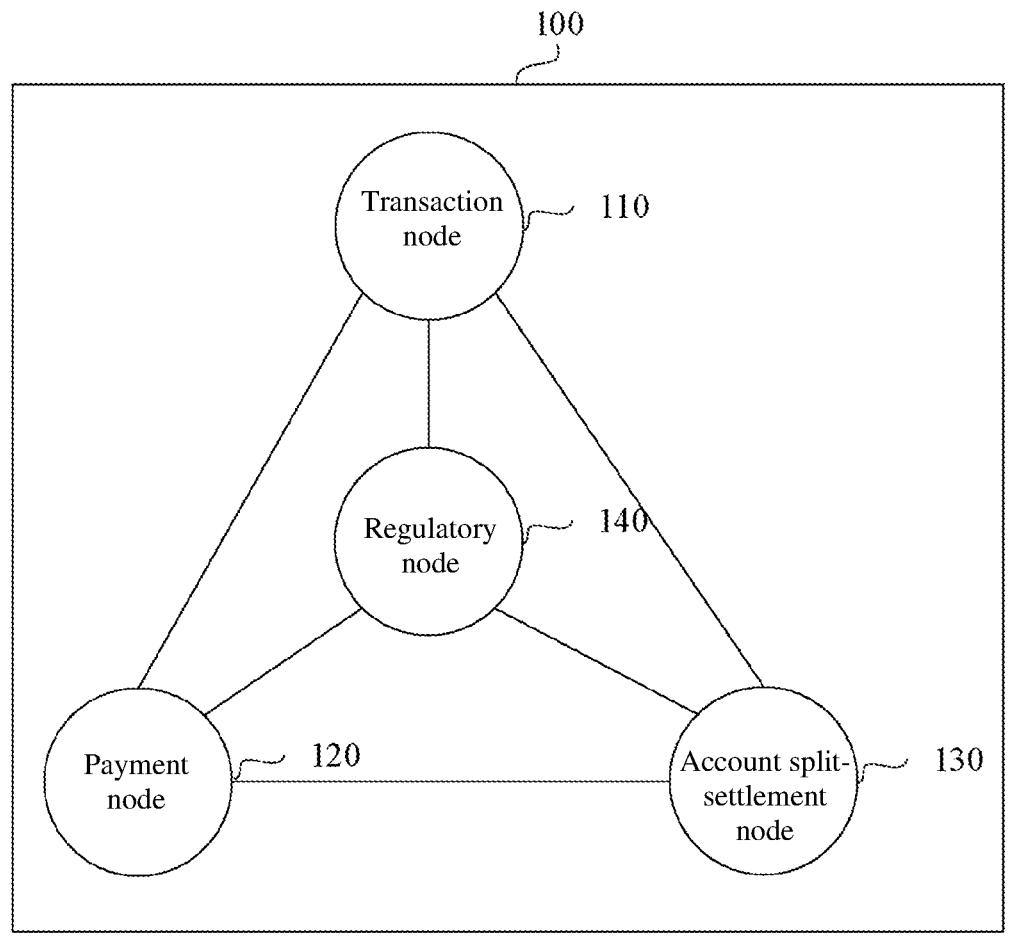
FIG. 1 is a schematic structural diagram of a consortium-blockchain-based data synchronization system, according to an embodiment of the specification.

Specifically, as shown in FIG. 1, a schematic structural diagram of a consortium-blockchain-based data synchronization system 100 according to one or more embodiments of the specification. A blockchain has a computer network of a plurality of blockchain nodes including a transaction node, a payment node, and a split-settlement node. The blockchain system (i.e., a consortium-blockchain-based data synchronization system 100) includes a transaction node 110, a payment node 120, and a split-settlement node (i.e., an account split-settlement node 130.)

The transaction node 110 creates a transaction order based on a transaction record, and uploads the transaction order to a consortium blockchain via the computer network, for the payment node and the account split-settlement node to confirm the transaction order.

The payment node 120 creates a payment order based on a payment record of a payer associated with the transaction order, and uploads the payment order to the consortium blockchain for the transaction node and the account split-settlement node to confirm the payment order.

The account split-settlement node 130 performs a split-settlement operation (i.e., an account split-settlement operation) based on a fund transfer operation performed by the payment node to the account split-settlement node with respect to the payment order, creates a split-settlement record (i.e., an account split-settlement record) based on the account split-settlement operation, and uploads the account split-settlement record to the consortium blockchain for the transaction node and the payment node to confirm the account split-settlement record, wherein the account split-settlement record is broadcasted to blockchain nodes of the blockchain. The split-settlement operation is an operation that the received fund is split and transferred to different accounts or different blockchain nodes simultaneously.

In an embodiment, to ensure that the transaction order uploaded to the consortium blockchain is uploaded by the transaction node, the transaction order uploaded to the consortium blockchain includes an original transaction order and a signature affixed by the transaction node to a digest of the transaction order. Therefore, the uploading, by the transaction node 110, the transaction order to the consortium blockchain includes: signing, by the transaction node 110, the digest of the transaction order using a private key of the transaction node to obtain the signature (i.e., a digital signature) and uploading (including broadcasting), by the transaction node 110, the signature on the digest of the transaction order and the transaction order to the consortium blockchain for confirmation by the payment node and the split-settlement node.

The signature affixed by the transaction node 110 to the digest of the transaction order using the private key of the transaction node indicates a confirmation of the transaction node 110 on the digest of the transaction order.

In an embodiment, to ensure that the transaction order uploaded to the consortium blockchain is uploaded by the transaction node, other nodes in the consortium blockchain may verify the transaction order, that is, verify an identity of an uploading node. Therefore, after the transaction node 110 uploads the signature on the digest of the transaction order and the transaction order to the consortium blockchain, the payment node 120 verifies the transaction order based on the signature on the digest of the transaction order and the transaction order and confirms the transaction order after the payment node successfully completes the verification, and the account split-settlement node 130 verifies the transaction order based on the signature on the digest of the transaction order and the transaction order and confirms the transaction order after the account split-settlement node successfully completes the verification.

For example, when the payment node 120 verifies the transaction order based on the signature on the digest of the transaction order and the transaction order, the specific verification process includes decrypting the signature (i.e., a digital signature) on the digest of the transaction order using a public key of the transaction node to obtain a first digest of the decrypted transaction order, and obtaining a second digest of the transaction order uploaded to the consortium blockchain. The second digest may be obtained by applying a hash function to the transaction order. If the first digest is consistent with the second digest, it indicates that the transaction order is uploaded to the consortium blockchain by the transaction node. The verification process for the payment order and the account split-settlement record is similar to the verification process for the transaction order described above, and will not be repeated herein.

In an embodiment, to ensure that the payment order uploaded to the consortium blockchain is uploaded by the payment node, the payment order uploaded to the consortium blockchain includes an original payment order and a signature affixed by the payment node to a digest of the payment order. Therefore, the uploading, by the payment node 120, the payment order to the consortium blockchain includes signing, by the payment node 120, the digest of the payment order using a private key of the payment node to obtain the signature (i.e., a digital signature) and uploading (including broadcasting), by the payment node 120, the signature on the digest of the payment order and the payment order to the consortium blockchain for confirmation by the transaction node and the split-settlement node.

In an embodiment, to ensure that the payment order uploaded to the consortium blockchain is uploaded by the payment node, other nodes in the consortium blockchain may verify the payment order, that is, verify an identity of the uploading node. Therefore, after the payment node 120 uploads the signature on the digest of the payment order and the payment order to the consortium blockchain, the transaction node 110 verifies the payment order based on the signature on the digest of the payment order and the payment order and confirms the payment order after the transaction node successfully completes the verification, and the account split-settlement node 130 verifies the payment order based on the signature on the digest of the payment order and the payment order and confirms the payment order after the account split-settlement node successfully completes the verification.

For example, when the transaction node 110 verifies the payment order based on the signature on the digest of the payment order and the payment order, the specific verification process includes decrypting the signature (i.e., a digital signature) on the digest of the payment order using a public key of the payment node to obtain a first digest of the decrypted payment order, and obtaining a second digest of the payment order uploaded to the consortium blockchain. The second digest may be obtained by applying a hash function to the payment order. If the first digest is consistent with the second digest, it indicates that the payment order is uploaded to the consortium blockchain by the payment node.

In an embodiment, the performing, by the account split-settlement node 130, an account split-settlement operation based on a fund transfer operation performed by the payment node on the account split-settlement node with respect to the payment order includes: verifying, by the account split-settlement node 130 and based on the fund transfer operation performed by the payment node on the account split-settlement node 130 with respect to the payment order, an amount of the fund transfer operation performed by the payment node 120 on the account split-settlement node 130; performing, if the account split-settlement node 130 successfully verifies the amount of the fund transfer operation performed by the payment node 120 on the account split-settlement node 130, the account split-settlement operation based on the payment order, wherein the payment order includes a payer in the transaction order, a payee in the transaction order, and an amount paid by the payer to the payee through the payment node.

In an embodiment, to avoid an erroneous account split-settlement operation performed by the account split-settlement node 130, the account split-settlement node may also verify a corresponding amount before performing the account split-settlement operation. Therefore, the verifying, by the account split-settlement node 130, the amount in the fund transfer operation performed by the payment node on the account split-settlement node includes verifying, by the account split-settlement node 130 and based on whether the amount in the fund transfer operation performed by the payment node on the account split-settlement node is consistent with the amount paid by the payer to the payee through the payment node 120, the amount in the fund transfer operation performed by the payment node 120 on the account split-settlement node 130.

If the account split-settlement node 130 determines that the amount in the fund transfer operation performed by the payment node on the account split-settlement node is inconsistent with the amount paid by the payer to the payee through the payment node 120, the verification fails.

If the account split-settlement node 130 determines that the amount in the fund transfer operation performed by the payment node on the account split-settlement node is consistent with the amount paid by the payer to the payee through the payment node 120, the verification succeeds. Therefore, the performing, if the account split-settlement node 130 successfully verifies the amount in the fund transfer operation performed by the payment node 120 on the account split-settlement node 130, the account split-settlement operation based on the payment order includes performing the account split-settlement operation on the payee based on the amount paid by the payer to the payee through the payment node 120, if the amount in the fund transfer operation performed by the payment node on the account split-settlement node is successfully verified by the account split-settlement node 130 based on consistency between the amount in the fund transfer operation performed by the payment node 120 on the account split-settlement node 130 and the amount paid by the payer to the payee through the payment node 120.

In an embodiment, to ensure that the account split-settlement record uploaded to the consortium blockchain is uploaded by the account split-settlement node, the account split-settlement record uploaded to the consortium includes a signature affixed by the account split-settlement node to a digest of the account split-settlement record, and an original account split-settlement record. Therefore, the uploading, by the account split-settlement node 130, the account split-settlement record to the consortium blockchain includes signing, by the account split-settlement node 130, a digest of the account split-settlement record by using a private key of the account split-settlement node to obtain a signature (i.e., a digital signature) and uploading (including broadcasting), by the account split-settlement node 130, the signature on the account split-settlement record and the account split-settlement record to the consortium blockchain for confirmation by the transaction node and the payment node.

In an embodiment, to ensure that the account split-settlement record uploaded to the consortium blockchain is uploaded by the account split-settlement node, other nodes in the consortium blockchain may verify the account split-settlement record, that is, verify an identity of the uploading node. Therefore, after the uploading, by the account split-settlement node 130, the account split-settlement record to the consortium blockchain, the transaction node 110 verifies the account split-settlement record based on the signature on the digest of the account split-settlement record and the account split-settlement record and confirms the account split-settlement record after the transaction node 110 successfully completes the verification, and the payment node 120 verifies the account split-settlement record based on the signature on the digest of the account split-settlement record and the account split-settlement record and confirms the account split-settlement record after the account split-settlement node successfully completes the verification.

In an embodiment, the system further includes a regulatory node 140, and the regulatory node 140 confirms at least one of the transaction order, the payment order, or the account split-settlement record.

Figure 2:
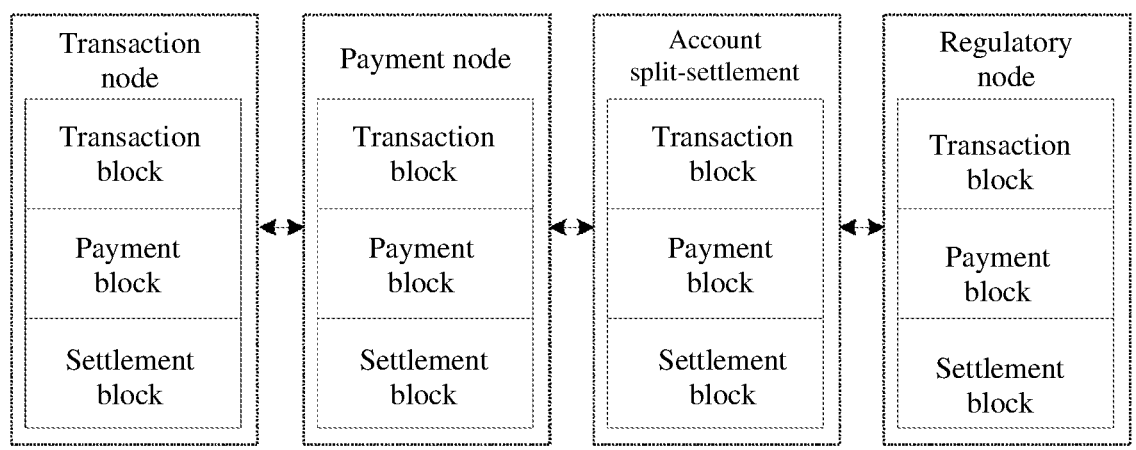
FIG. 2 is an overall schematic structural diagram of a consortium blockchain, according to an embodiment of the specification.
Figure 3:
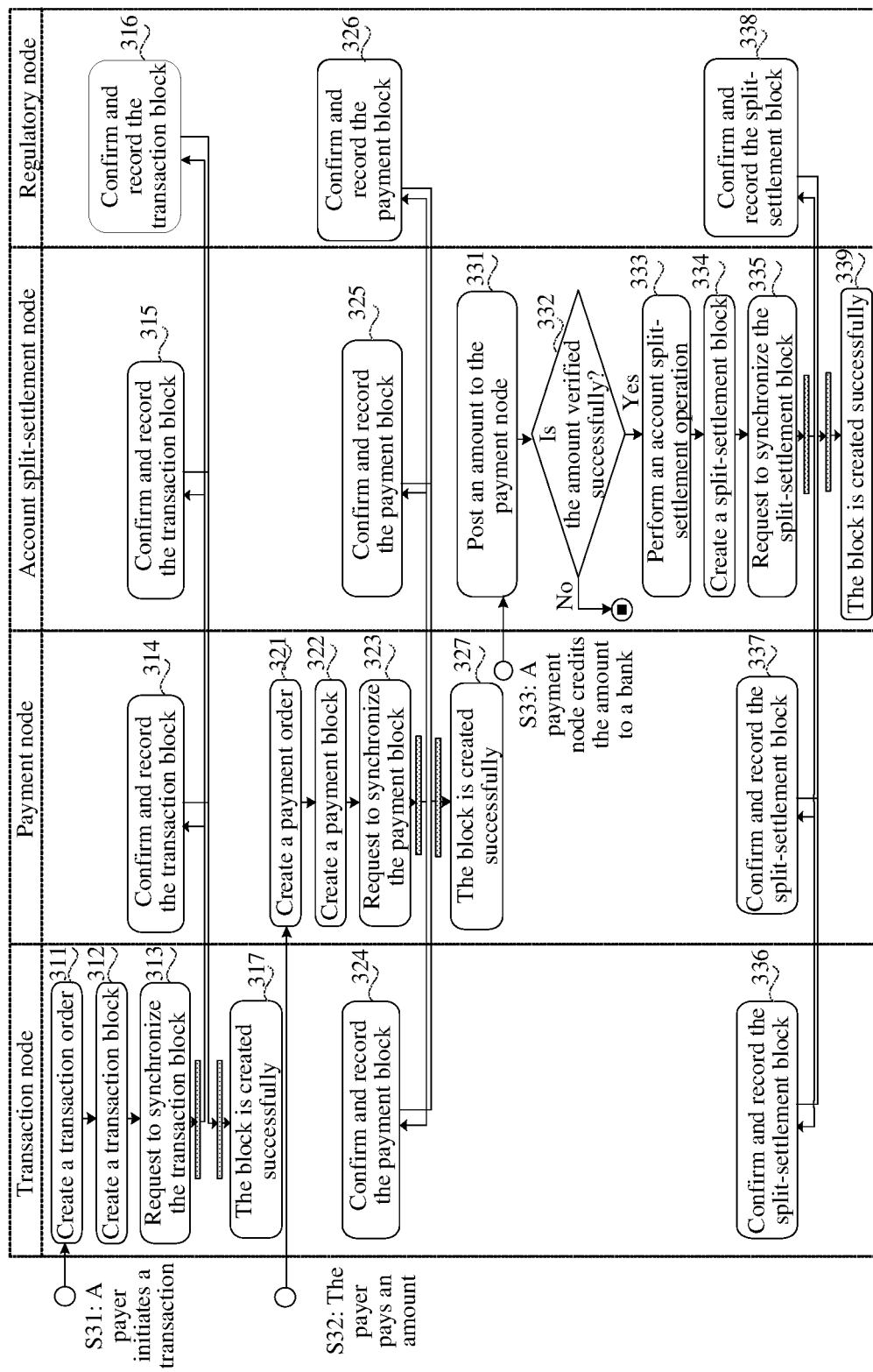
FIG. 3 is an implementation flowchart for applying a consortium-blockchain-based data synchronization method in an actual scenario, according to an embodiment of the specification.

The following description describes a system processing process provided in an embodiment of the specification in detail using examples in FIG. 2, which is an overall schematic structural diagram of a consortium blockchain, and FIG. 3, which is a flowchart of applying a consortium-blockchain-based data synchronization method to each node.

In FIG. 2, the overall structure of the consortium blockchain includes a transaction node, a payment node, an account split-settlement node, and a regulatory node. The account split-settlement node may be a banking system in an actual application, and is used to process account split-settlement business.

After the transaction node creates a transaction order, to prevent transaction information in the transaction order from being falsified during the subsequent account split-settlement, a corresponding transaction block may be created to store the transaction order. Subsequently, a request for synchronizing the transaction block is sent to blockchain nodes of the blockchain system, such as other nodes in the consortium blockchain, that is, the payment node, the account split-settlement node, and the regulatory node. After a confirmation feedback is received from the other nodes in the consortium blockchain, the transaction block is successfully created. At the same time, the transaction block is also uploaded, including broadcasted and recorded, in other nodes in the consortium blockchain.

After the payment node creates a payment order, to prevent payment information in the payment order from being falsified during the subsequent account split-settlement, a corresponding payment block may be created to store the payment order. Subsequently, a request for synchronizing the transaction block is sent to other nodes in the consortium blockchain, that is, the transaction node, the account split-settlement node, and the regulatory node. After a confirmation feedback is received from other nodes in the consortium blockchain, the payment block is successfully created. At the same time, the payment block is also recorded in other nodes in the consortium blockchain.

After the account split-settlement node performs an account split-settlement operation based on a fund transfer operation performed by the payment node on the account split-settlement node with respect to the payment order and creates an account split-settlement record based on the account split-settlement operation, to prevent the account split-settlement record from being falsified during subsequent operations, a settlement block may be created to store the account split-settlement record. Subsequently, a request for synchronizing the settlement block is sent to other nodes in the consortium blockchain, that is, the transaction node, the payment node, and the regulatory node. After a confirmation feedback is received from other nodes in the consortium blockchain, the settlement block is successfully created. At the same time, the settlement block is also recorded in other nodes in the consortium blockchain.

As shown in FIG. 3, an account split-settlement operation usually includes the following steps.

S31, a payer initiates a transaction at a transaction node.

For example, the payer (that is, a client) may initiate a transaction (that is, submits an order) on a shopping application platform (that is, a transaction node) with respect to a product provided by the shopping application platform.

After step S31 is triggered, the transaction node creates a transaction block and synchronizes the transaction block in an consortium blockchain. The embodiment thereof includes the following steps.

S311, the transaction node creates a transaction order based on a transaction record of the payer. The transaction order includes information such as the payer, the payee, the transaction product, and the transaction amount.

S312, the transaction node creates a transaction block. The transaction block is used to store the transaction order.

S313, the transaction node requests other nodes in the consortium blockchain to synchronize the transaction block.

S314, after receiving the synchronization request message from the transaction node, the payment node verifies the synchronization request message based on a signature that is on a digest of the transaction order and that is carried in the synchronization request message and on the transaction order, and records the transaction block after the verification succeeds. After recording the transaction block, the payment node sends a feedback message of successful recording to the transaction node.

S315, after receiving the synchronization request message from the transaction node, the account split-settlement node verifies the synchronization request message based on the signature that is on a digest of the transaction order and that is carried in the synchronization request message and on the transaction order, and records the transaction block after the verification succeeds. After recording the transaction block, the account split-settlement node sends a feedback message of successful recording to the transaction node.

S316, after receiving the synchronization request message from the transaction node, the regulatory node verifies the synchronization request message based on the signature that is on a digest of the transaction order and that is carried in the synchronization request message and on the transaction order, and records the transaction block after the verification succeeds. After recording the transaction block, the regulatory node sends a feedback message of successful recording to the transaction node.

S317, after it is determined that all other nodes in the consortium blockchain have confirmed and recorded the transaction block, the transaction block is successfully created in the consortium blockchain.

S32, the payer pays an amount for the transaction product through the payment node.

For example, after submitting an order, the payer may pay the amount for the transaction product through a payment platform (that is, a payment node). In this case, the amount paid for the transaction product is received by the payment node.

After step S32 is triggered, the payment node creates a payment block and synchronizes the payment block in the consortium blockchain. The embodiment thereof includes the following steps.

S321, the payment node creates a payment order based on a payment record of the payer. The payment order includes information such as the payer, the payee, the transaction product, and the paid amount.

S322, the payment node creates a payment block. The payment block is used to store the payment order.

S323, the payment node requests other nodes in the consortium blockchain to synchronize the payment block.

S324, after receiving the synchronization request message from the payment node, the transaction node verifies the synchronization request message based on a signature that is on a digest of the payment order and that is carried in the synchronization request message and on the payment order, and records the payment block after the verification succeeds. After recording the payment block, the transaction node sends a feedback message of successful recording to the payment node.

S325, after receiving the synchronization request message from the payment node, the account split-settlement node verifies the synchronization request message based on a signature that is on a digest of the payment order and that is carried in the synchronization request message and on the payment order, and records the payment block after the verification succeeds. After recording the payment block, the account split-settlement node sends a feedback message of successful recording to the payment node.

S326, after receiving the synchronization request message from the payment node, the regulatory node verifies the synchronization request message based on a signature that is on a digest of the payment order and that is carried in the synchronization request message and on the payment order, and records the payment block after the verification succeeds. After recording the payment block, the regulatory node sends a feedback message of successful recording to the payment node.

S327, after it is determined that all other nodes in the consortium blockchain have confirmed and recorded the payment block, the payment block is successfully created in the consortium blockchain.

S33, the payment node credits the amount paid by the payer for the transaction product to the account split-settlement node.

After step S33 is triggered, the account split-settlement node creates a settlement block, such as a split-settlement block, and synchronizes the settlement block in the consortium blockchain. The embodiment thereof includes the following steps.

S331, post the amount credited by the payment node, to the corresponding payment node.

S332, verify the amount credited by the payment node.

The amount of the transaction product in the transaction block, the payment block, as well as the amount paid by the payer are compared with the amount credited by the payment node. If the amounts are consistent, the verification succeeds. If the amounts are not consistent, the verification fails, and the process ends.

S333, the account split-settlement node performs an account split-settlement operation, that is, by debiting the amount from the payer in the payment order, and settling the amount credited by the payment node.

S334, the account split-settlement node creates a settlement block, such as a split-settlement block. The settlement block is used to store the account split-settlement record about the account split-settlement operation.

S335, the account split-settlement node requests other nodes in the consortium blockchain to synchronize the settlement block.

S336, after receiving the synchronization request message from the account split-settlement node, the transaction node verifies the synchronization request message based on the signature that is on a digest of the account split-settlement record and that is carried in the synchronization request message and on the account split-settlement record, and records the settlement block after the verification succeeds. After recording the settlement block, the transaction node sends a feedback message of successful recording to the account split-settlement node.

S337, after receiving the synchronization request message from the account split-settlement node, the payment node verifies the synchronization request message based on the signature that is on a digest of the account split-settlement record and that is carried in the synchronization request message and on the account split-settlement record, and records the settlement block after the verification succeeds.

After recording the settlement block, the payment node sends a feedback message of successful recording to the account split-settlement node.

S338, after receiving the synchronization request message from the account split-settlement node, the regulatory node verifies the synchronization request message based on the signature that is on a digest of the account split-settlement record and that is carried in the synchronization request message and on the account split-settlement record, and records the settlement block after the verification succeeds. After recording the settlement block, the regulatory node sends a feedback message of successful recording to the account split-settlement node.

S339, after it is determined that all other nodes in the consortium blockchain have confirmed and recorded the settlement block, the settlement block is successfully created in the consortium blockchain.

After creating a transaction order based on the transaction record, the transaction node may broadcasting the transaction order to blockchain nodes of a blockchain, such as upload the transaction order to the consortium blockchain for other nodes in the consortium blockchain to confirm the transaction order, thereby synchronizing the transaction order between all nodes in the consortium blockchain. After creating a payment order based on the payment record, the payment node may broadcasting the payment order to blockchain nodes of a blockchain, such as upload the payment order to the consortium blockchain for other nodes in the consortium blockchain to confirm the payment order, thereby synchronizing the payment order between all nodes in the consortium blockchain. After performing an account split-settlement operation, the account split-settlement node can create an account split-settlement record based on the account split-settlement operation, and broadcasting the split-settlement record to blockchain nodes of a blockchain, such as upload the account split-settlement record to the consortium blockchain for other nodes in the consortium blockchain to confirm the account split-settlement record, thereby synchronizing the account split-settlement record between all nodes in the consortium blockchain.

Due to the advantage of the characteristic that information in the consortium blockchain is unfalsifiable, the transaction order, the payment order, and the account split-settlement record are all uploaded to the consortium blockchain. After being confirmed by other nodes than the uploading node in the consortium blockchain, the data is synchronized, thereby preventing falsification of original data in the process of transaction and account split-settlement.

Figure 4:
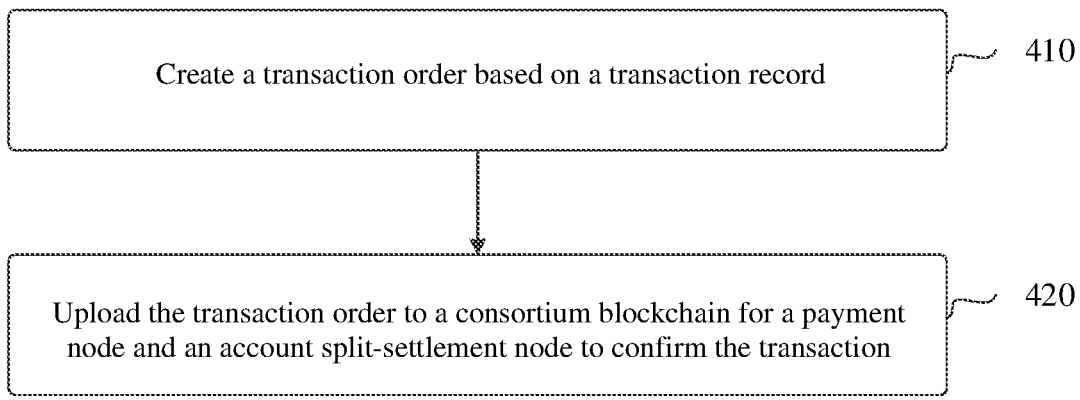
FIG. 4 is an implementation flowchart for applying a consortium-blockchain-based data synchronization method to a transaction node, according to an embodiment of the specification.

FIG. 4 is an implementation flowchart of applying a consortium-blockchain-based data synchronization method to a transaction node, according to an embodiment of the specification. As shown in FIG. 4, the method includes the following steps.

Step 410, create a transaction order based on a transaction record.

Step 420, upload the transaction order to a consortium blockchain for a payment node and an account split-settlement node to confirm the transaction order.

In an embodiment, the uploading the transaction order to the consortium blockchain includes signing a digest of the transaction order by using a private key of the transaction node, and uploading the signature on the digest of the transaction order and the transaction order to the consortium blockchain.

In an embodiment, after the uploading, by the transaction node, the signature on the digest of the transaction order and the transaction order to the consortium blockchain, the payment node verifies the transaction order based on the signature on the digest of the transaction order and the transaction order and confirms the transaction order after the payment node successfully completes the verification, and the account split-settlement node verifies the transaction order based on the signature on the digest of the transaction order and the transaction order and confirms the transaction order after the account split-settlement node successfully completes the verification.

For a specific implementation of relevant steps in the embodiment shown in FIG. 4, reference may be made to the specific implementation of corresponding steps in the embodiment shown in FIG. 1, which will not be repeated herein.

After creating a transaction order based on the transaction record, the transaction node may upload the transaction order to the consortium blockchain for other nodes in the consortium blockchain to confirm the transaction order, thereby synchronizing the transaction order between all nodes in the consortium blockchain. Taking the advantage of the characteristic that information in the consortium blockchain is unfalsifiable, the transaction order is uploaded to the consortium blockchain. After being confirmed by other nodes than the transaction node in the consortium blockchain, the data is synchronized, thereby preventing falsification of original transaction data in the subsequent process of account split-settlement.

Figure 5:
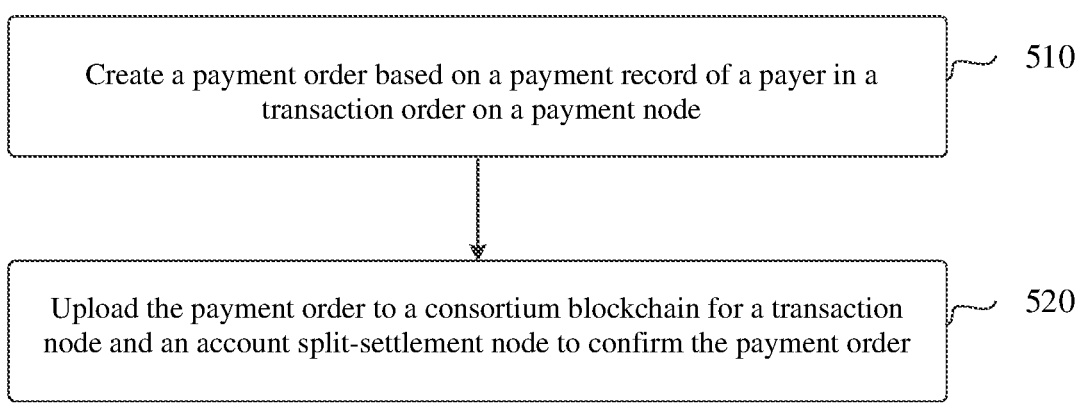
FIG. 5 is an implementation flowchart for applying a consortium-blockchain-based data synchronization method to a payment node, according to an embodiment of the specification.

FIG. 5 is an implementation flowchart of applying an consortium-blockchain-based data synchronization method to a payment node, according to an embodiment of the specification. As shown in FIG. 5, the method includes the following steps.

Step 510, create a payment order based on a payment record of a payer in a transaction order on the payment node.

Step 520, upload the payment order to an consortium blockchain for a transaction node and an account split-settlement node to confirm the payment order, wherein the transaction order is uploaded by the transaction node to the consortium blockchain, and the transaction order has been confirmed by the payment node and the account split-settlement node.

In an embodiment, the uploading the payment order to the consortium blockchain includes signing a digest of the payment order by using a private key of the payment node, and uploading the signature on the digest of the payment order and the payment order to the consortium blockchain.

In an embodiment, after the uploading, by the payment node, the signature on the digest of the payment order and the payment order to the consortium blockchain, the transaction node verifies the payment order based on the signature on the digest of the payment order and the payment order and confirms the payment order after the transaction node successfully completes the verification, and the account split-settlement node verifies the payment order based on the signature on the digest of the payment order and the payment order and confirms the payment order after the account split-settlement node successfully completes the verification.

For a specific implementation of relevant steps in the embodiment shown in FIG. 5, reference may be made to the specific implementation of corresponding steps in the embodiment shown in FIG. 1, which will not be repeated herein.

After creating a payment order based on the payment record, the payment node may upload the payment order to the consortium blockchain for other nodes in the consortium blockchain to confirm the payment order, thereby synchronizing the payment order between all nodes in the consortium blockchain. Taking the advantage of the characteristic that information in the consortium blockchain is unfalsifiable, the payment order is uploaded to the consortium blockchain. After being confirmed by other nodes than the payment node in the consortium blockchain, payment data is synchronized, thereby preventing falsification of original payment data in the subsequent process of account split-settlement.

Figure 6:
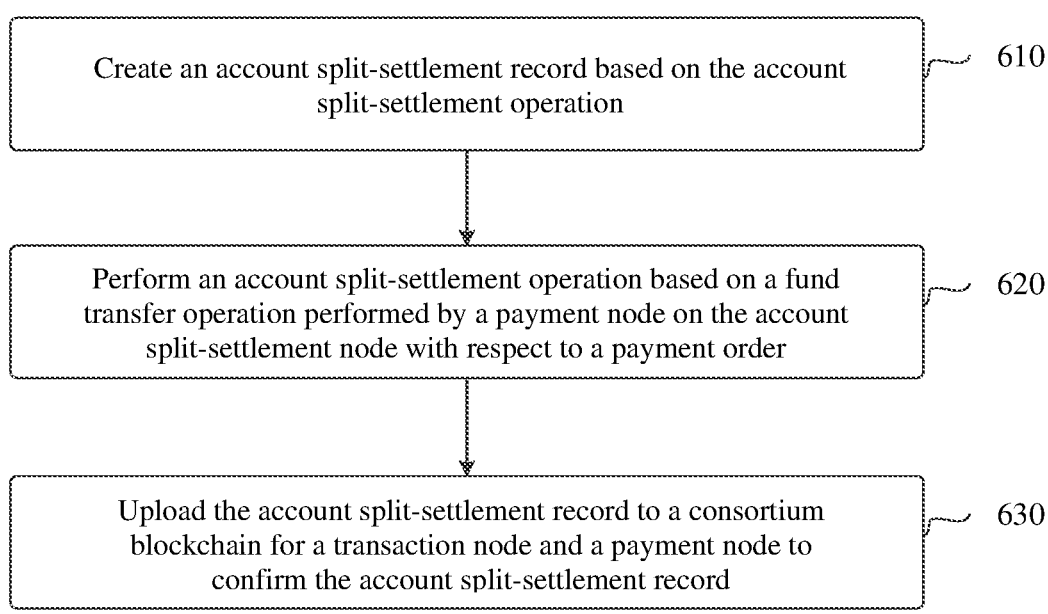
FIG. 6 is an implementation flowchart for applying a consortium-blockchain-based data synchronization method to an account split-settlement node, according to an embodiment of the specification.

FIG. 6 is an implementation flowchart of applying an consortium-blockchain-based data synchronization method to an account split-settlement node, according to an embodiment of the specification. As shown in FIG. 6, the method includes the following steps.

Step 610, perform an account split-settlement operation based on a fund transfer operation performed by a payment node on the account split-settlement node with respect to a payment order.

Step 620, create an account split-settlement record based on the account split-settlement operation.

Step 630, upload the account split-settlement record to a consortium blockchain for a transaction node and the payment node to confirm the account split-settlement record.

The payment order is uploaded by the payment node to the consortium blockchain, and the payment order has been confirmed by the transaction node and the account split-settlement node.

In an embodiment, the performing an account split-settlement operation based on a fund transfer operation performed by a payment node on the account split-settlement node with respect to the payment order includes verifying, based on the fund transfer operation performed by the payment node on the account split-settlement node with respect to the payment order, an amount in the fund transfer operation performed by the payment node on the account split-settlement node, and performing, if the amount in the fund transfer operation performed by the payment node on the account split-settlement node is successfully verified, the account split-settlement operation based on the payment order.

The payment order includes a payer in the transaction order, a payee in the transaction order, and an amount paid by the payer to the payee through the payment node.

In an embodiment, the verifying an amount in the fund transfer operation performed by the payment node on the account split-settlement node includes verifying, based on whether the amount in the fund transfer operation performed by the payment node on the account split-settlement node is consistent with the amount paid by the payer to the payee through the payment node, the amount in the fund transfer operation performed by the payment node on the account split-settlement node.

In an embodiment, the performing, if the amount in the fund transfer operation performed by the payment node on the account split-settlement node is successfully verified, the account split-settlement operation based on the payment order includes: performing the account split-settlement operation on the payee based on the amount paid by the payer to the payee through the payment node, if the amount in the fund transfer operation performed by the payment node on the account split-settlement node is successfully verified based on consistency between the amount in the fund transfer operation performed by the payment node on the account split-settlement node and the amount paid by the payer to the payee through the payment node.

In an embodiment, the uploading the account split-settlement record to the consortium blockchain includes: signing a digest of the account split-settlement record using a private key of the account split-settlement node, and uploading the signature on the account split-settlement record and the account split-settlement record to the consortium blockchain.

In an embodiment, after the uploading, by the account split-settlement node, the account split-settlement record to the consortium blockchain, the transaction node verifies the account split-settlement record based on the signature on the account split-settlement record and the account split-settlement record and confirms the account split-settlement record after the transaction node successfully completes the verification, and the payment node verifies the account split-settlement record based on the signature on the account split-settlement record and the account split-settlement record and confirms the account split-settlement record after the account split-settlement node successfully completes the verification.

For a specific implementation of relevant steps in the embodiment shown in FIG. 6, reference may be made to the specific implementation of corresponding steps in the embodiment shown in FIG. 1, which will not be repeated herein.

After performing an account split-settlement operation, the account split-settlement node can create an account split-settlement record based on the account split-settlement operation, and upload the account split-settlement record to the consortium blockchain for other nodes in the consortium blockchain to confirm the account split-settlement record, thereby synchronizing the account split-settlement record between all nodes in the consortium blockchain. Taking the advantage of the characteristic that information in the consortium blockchain is unfalsifiable, all account split-settlement records are uploaded to the consortium blockchain. After being confirmed by other nodes than the account split-settlement node in the consortium blockchain, the account split-settlement data is synchronized, thereby preventing falsification of original data in the process of account split-settlement.

Figure 7:
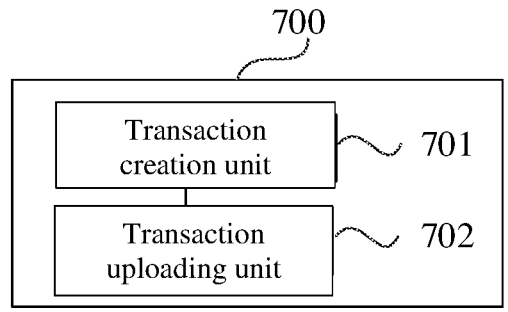
FIG. 7 is a schematic structural diagram of a transaction node, according to an embodiment of the specification.

FIG. 7 is a schematic structural diagram of a transaction node 700, according to an embodiment of the specification. Referring to FIG. 7, for example in a software implementation, the transaction node 700 may include a transaction creation unit 701 and a transaction uploading unit 702.

The transaction creation unit 701 is configured to create a transaction order based on a transaction record.

The transaction uploading unit 702 is configured to upload the transaction order to a consortium blockchain for a payment node and an account split-settlement node to confirm the transaction order.

In an embodiment, the transaction uploading unit 702 is configured to sign a digest of the transaction order using a private key of the transaction node, and upload the signature on the digest of the transaction order and the transaction order to the consortium blockchain.

The transaction node 700 can implement the method in the method embodiment shown in FIG. 4. For details, see the consortium-blockchain-based data synchronization method in the embodiment shown in FIG. 4, which will not be repeated herein.

Figure 8:
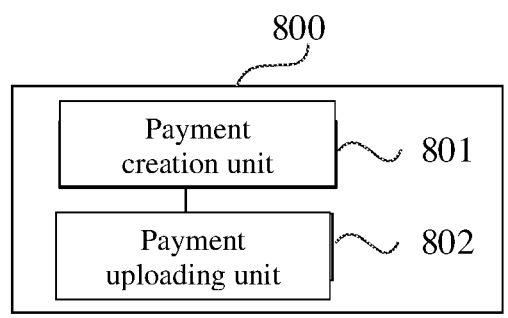
FIG. 8 is a schematic structural diagram of a payment node, according to an embodiment of the specification.

FIG. 8 is a schematic structural diagram of a payment node 800, according to an embodiment of the specification. Referring to FIG. 8, for example in a software implementation, the payment node 800 may include a payment creation unit 801 and a payment uploading unit 802.

The payment creation unit 801 is configured to create a payment order based on a payment record.

The payment uploading unit 802 is configured to upload the payment order to a consortium blockchain for a transaction node and an account split-settlement node to confirm the payment order.

In an embodiment, the payment uploading unit 802 is configured to sign a digest of the payment order using a private key of the payment node, and upload the signature on the digest of the payment order and the payment order to the consortium blockchain.

The payment node 800 can implement the method in the method embodiment shown in FIG. 5. For details, see the consortium-blockchain-based data synchronization method in the embodiment shown in FIG. 5, which will not be repeated herein.

Figure 9:
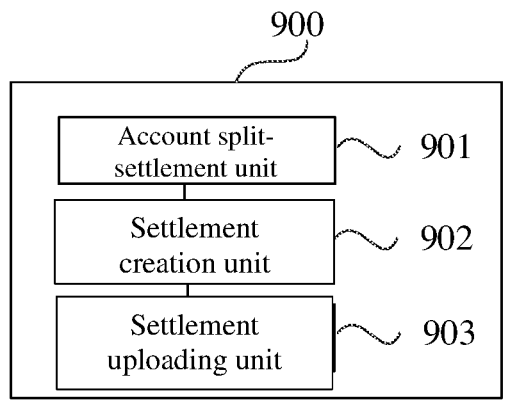
FIG. 9 is a schematic structural diagram of an account split-settlement node, according to an embodiment of the specification.

FIG. 9 is a schematic structural diagram of an account split-settlement node 900, according to an embodiment of the specification. Referring to FIG. 9, for example in a software implementation, the account split-settlement node 900 may include an account split-settlement unit 901, a settlement creation unit 902, and a settlement uploading unit 903.

The account split-settlement unit 901 is configured to perform an account split-settlement operation based on a fund transfer operation performed by a payment node on the account split-settlement node with respect to a payment order.

The settlement creation unit 902 is configured to create an account split-settlement record based on the account split-settlement operation.

The settlement uploading unit 903 is configured to upload the account split-settlement record to a consortium blockchain for a transaction node and a payment node to confirm the account split-settlement record.

The payment order is uploaded by the payment node to the consortium blockchain, and the payment order has been confirmed by the transaction node and the account split-settlement node.

In an embodiment, the account split-settlement unit 901 is configured to verify, based on the fund transfer operation performed by the payment node on the account split-settlement node with respect to the payment order, an amount in the fund transfer operation performed by the payment node on the account split-settlement node, and perform, if the amount in the fund transfer operation performed by the payment node on the account split-settlement node is successfully verified, the account split-settlement operation based on the payment order.

The payment order includes a payer in the transaction order, a payee in the transaction order, and an amount paid by the payer to the payee through the payment node.

In an embodiment, the account split-settlement unit 901 is configured to, verify, based on whether the amount in the fund transfer operation performed by the payment node on the account split-settlement node is consistent with the amount paid by the payer to the payee through the payment node, the amount in the fund transfer operation performed by the payment node on the account split-settlement node.

In an embodiment, the account split-settlement unit 901 is configured to perform the account split-settlement operation on the payee based on the amount paid by the payer to the payee through the payment node, if the amount in the fund transfer operation performed by the payment node on the account split-settlement node is successfully verified based on consistency between the amount in the fund transfer operation performed by the payment node on the account split-settlement node and the amount paid by the payer to the payee through the payment node.

In an embodiment, the settlement uploading unit 903 is configured to sign a digest of the account split-settlement record using a private key of the account split-settlement node, and upload the signature on the account split-settlement record and the account split-settlement record to the consortium blockchain.

The account split-settlement node 900 can implement the method in the method embodiment shown in FIG. 6. For details, see the consortium-blockchain-based data synchronization method in the embodiment shown in FIG. 6, which will not be repeated herein.

Figure 10:
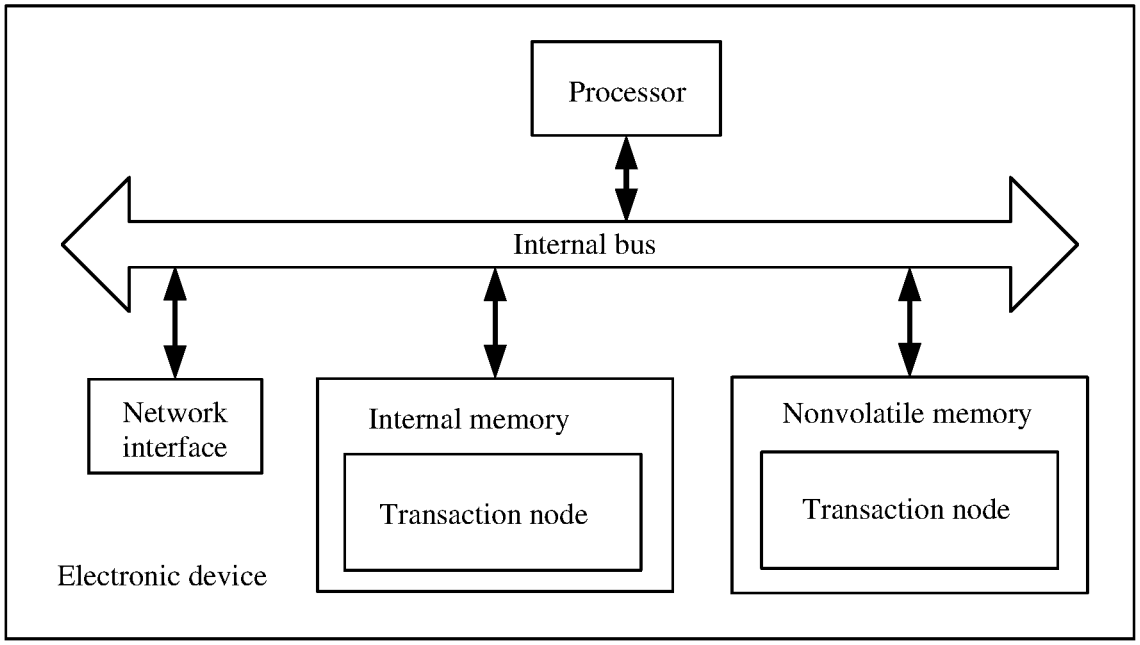
FIG. 10 is a schematic structural diagram of an electronic device, according to an embodiment of the specification.

FIG. 10 is a schematic structural diagram of an electronic device, according to an embodiment of the specification. Referring to FIG. 10, the electronic device includes hardware of a processor, an internal bus, a network interface, and a memory. The memory may include an internal memory, such as a high-speed random access memory (RAM), and may further include a non-volatile memory such as at least one disk memory. Certainly, the electronic device may further include hardware required for other services.

The processor, the network interface, and the memory can be connected to each other through an internal bus. The internal bus may be an industry standard architecture (ISA) bus, a peripheral component interconnect (PCI) bus, or an extended industry standard architecture (EISA) bus, or the like. The bus may be classed into an address bus, a data bus, a control bus, and the like. For ease of illustration, only one bidirectional arrow is used in FIG. 10 to represent the bus, but this does not mean that there is only one bus or only one type of bus.

The memory is configured to store a program. Specifically, the program may include program code, and the program code includes computer-executable instructions. The memory may include an internal memory and a non-volatile memory, and provide an instruction and data to the processor.

The processor reads a corresponding computer program from the non-volatile memory, and runs the computer program in the internal memory to form a transaction node logically. The processor executes the program stored in the memory, and is specifically configured to perform the following operations create a transaction order based on a transaction record, and upload the transaction order to an consortium blockchain for a payment node and an account split-settlement node to confirm the transaction order.

The consortium-blockchain-based data synchronization method disclosed in the embodiment shown in FIG. 4 may be implemented on a processor or implemented by a processor. The processor may be an integrated circuit chip and has a signal processing capability.

In an embodiment, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. The processor can implement or execute each method, step, and logic block diagram disclosed in one or more embodiments in the specification. The general-purpose processor may be a microprocessor, or the processor may be any conventional processor or the like. Steps of the method disclosed with reference to one or more embodiments in the specification may be directly implemented by a hardware decoding processor, or implemented by a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may also perform the consortium-blockchain-based data synchronization method shown in FIG. 4, details of which will not be repeated herein.

In addition to a software implementation, the electronic device in the specification does not exclude other implementations, for example, a logic device or a combination of software and hardware. In other words, an entity executing the following processing procedure is not limited to the logic units, and may also be hardware or logic devices.

Figure 11:
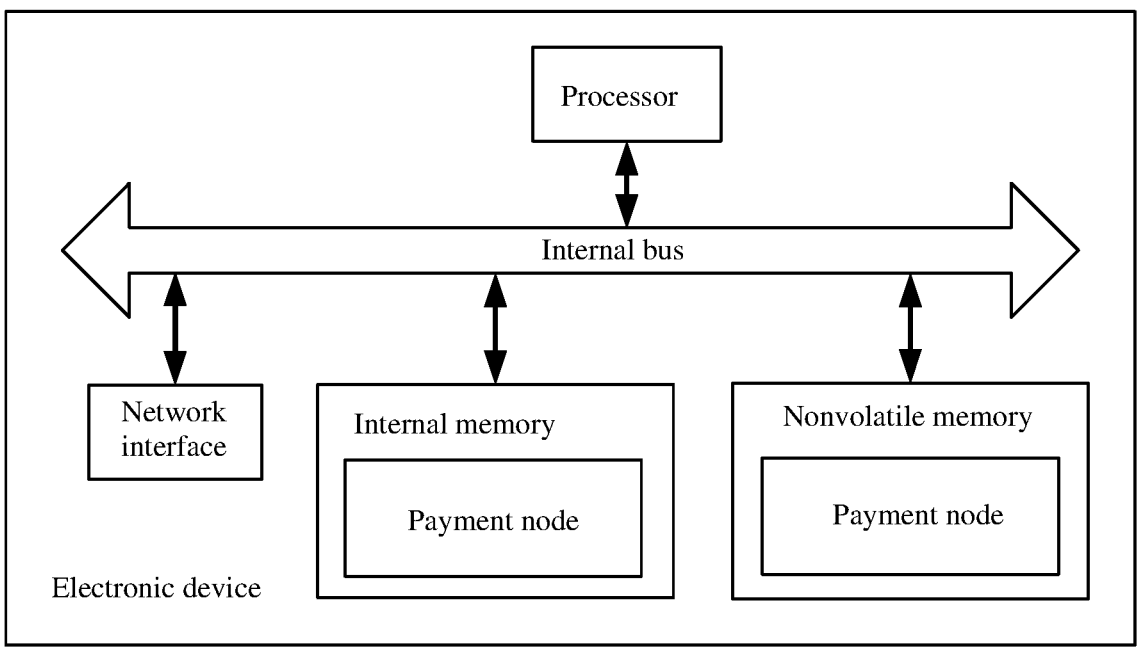
FIG. 11 is a schematic structural diagram of an electronic device, according to another embodiment of the specification.

FIG. 11 is a schematic structural diagram of another electronic device, according to an embodiment of the specification. Referring to FIG. 11, the electronic device includes hardware of a processor, an internal bus, a network interface, and a memory. The memory may include an internal memory, such as a high-speed random access memory (RAM), and may further include a non-volatile memory such as at least one disk memory. Certainly, the electronic device may further include hardware required for other services.

The processor, the network interface and the memory can be connected to each other through an internal bus. The internal bus may be an industry standard architecture (ISA) bus, a peripheral component interconnect (PCI) bus, or an extended industry standard architecture (EISA) bus, or the like. The bus may be classed into an address bus, a data bus, a control bus, and the like. For ease of illustration, only one bidirectional arrow is used in FIG. 11 to represent the bus, but this does not mean that there is only one bus or only one type of bus.

The memory is configured to store a program. Specifically, the program may include program code, and the program code includes computer-executable instructions. The memory may include an internal memory and a non-volatile memory, and provide an instruction and data to the processor.

The processor reads a corresponding computer program from the non-volatile memory, and runs the computer program in the internal memory to form a payment node logically. The processor executes the program stored in the memory, and is specifically configured to perform the following operations creating a payment order based on a payment record of a payer in a transaction order on the payment node, and uploading the payment order to an consortium blockchain for a transaction node and an account split-settlement node to confirm the payment order, wherein the transaction order is uploaded by the transaction node to the consortium blockchain, and the payment order has been confirmed by the payment node and the account split-settlement node.

The consortium-blockchain-based data synchronization method disclosed in the embodiment shown in FIG. 5 may be implemented on a processor or implemented by a processor. The processor may be an integrated circuit chip and has a signal processing capability.

In an embodiment, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. The processor can implement or execute each method, step, and logic block diagram disclosed in one or more embodiments in the specification. The general-purpose processor may be a microprocessor, or the processor may be any conventional processor or the like. Steps of the method disclosed with reference to one or more embodiments in the specification may be directly implemented by a hardware decoding processor, or implemented by a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may also perform the consortium-blockchain-based data synchronization method shown in FIG. 5, details of which are not repeated herein.

In addition to a software implementation, the electronic device in the specification does not exclude other implementations, for example, a logic device or a combination of software and hardware. In other words, an entity executing the following processing procedure is not limited to the logic units, and may also be hardware or logic devices.

Figure 12:
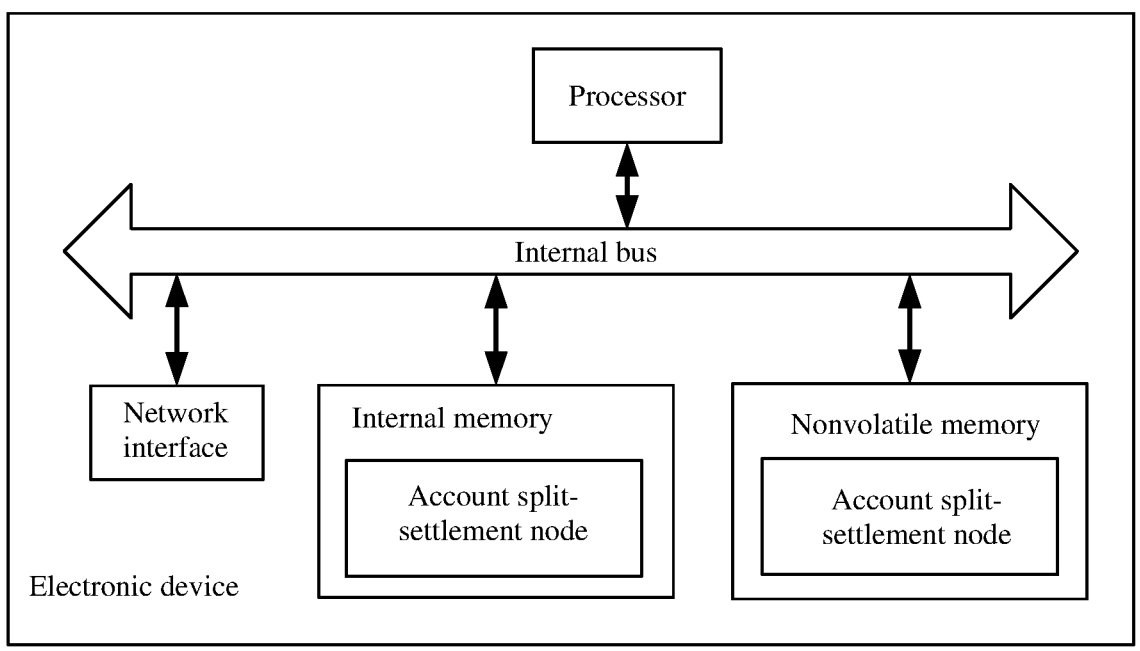
FIG. 12 is a schematic structural diagram of an electronic device, according to another embodiment of the specification.

FIG. 12 is a schematic structural diagram of still another electronic device, according to an embodiment of the specification. Referring to FIG. 12, the electronic device includes hardware of a processor, an internal bus, a network interface, and a memory. The memory may include an internal memory, such as a high-speed random access memory (RAM), and may further include a non-volatile memory such as at least one disk memory. Certainly, the electronic device may further include hardware required for other services.

The processor, the network interface and the memory can be connected to each other through an internal bus. The internal bus may be an industry standard architecture (ISA) bus, a peripheral component interconnect (PCI) bus, or an extended industry standard architecture (EISA) bus, or the like. The bus may be classed into an address bus, a data bus, a control bus, and the like. For ease of illustration, only one bidirectional arrow is used in FIG. 12 to represent the bus, but this does not mean that there is only one bus or only one type of bus.

The memory is configured to store a program. Specifically, the program may include program code, and the program code includes computer-executable instructions. The memory may include an internal memory and a non-volatile memory, and provide an instruction and data to the processor.

The processor reads a corresponding computer program from the non-volatile memory, and runs the computer program in the internal memory to form a transaction node logically. The processor executes the program stored in the memory, and is specifically configured to perform the following operations: performing an account split-settlement operation based on a fund transfer operation performed by a payment node on an account split-settlement node with respect to a payment order; creating an account split-settlement record based on the account split-settlement operation; and uploading the account split-settlement record to a consortium blockchain for a transaction node and a payment node to confirm the account split-settlement record. The payment order is uploaded by the payment node to the consortium blockchain, and the payment order has been confirmed by the transaction node and the account split-settlement node.

The consortium-blockchain-based data synchronization method disclosed in the embodiment shown in FIG. 6 may be implemented on a processor or implemented by a processor. The processor may be an integrated circuit chip capable of processing signals. In an embodiment, steps of the foregoing method may be implemented by using a hardware integrated logic circuit in the processor or instructions in a form of software. The processor may be a general-purpose processor, such as a central processing unit (CPU) or a network processor (NP); and may be a digital signal processor (DSP), an application-specific integrated circuit (ASIC), a field programmable gate array (FPGA) or another programmable logical device, a discrete gate or a transistor logical device, or a discrete hardware component. The processor can implement or perform the methods, steps, and logical block diagrams disclosed in one or more embodiments of the specification. The general-purpose processor may be a microprocessor, or the processor may be any conventional processor or the like. The steps of the method disclosed in one or more embodiments of the specification may be directly implemented by a hardware decoding processor, or implemented by a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor.

The electronic device may also perform the consortium-blockchain-based data synchronization method shown in FIG. 6, details of which are not repeated herein.

In addition to a software implementation, the electronic device in the specification does not exclude other implementations, for example, a logic device or a combination of software and hardware. In other words, an entity executing the following processing procedure is not limited to the logic units, and may also be hardware or logic devices.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

The foregoing descriptions are merely some embodiments of the specification, but do not limit the protection scope of the specification. Any modification, equivalent replacement, or improvement made within the spirit and principle of one or more embodiments of the specification shall fall within the protection scope of one or more embodiments of the specification.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the specification, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

What is claimed is:

1. A method for blockchain-based data synchronization implemented in a blockchain having a computer network of a plurality of blockchain nodes, the blockchain nodes comprising a transaction node, a payment node, and a split-settlement node, the method comprising:

receiving, by the split-settlement node from the transaction node via the computer network, a transaction order created based on a transaction record and broadcasted by the transaction node to the plurality of blockchain nodes;

confirming, by the split-settlement node, the received transaction order broadcasted by the transaction node;

storing, by the split-settlement node, the transaction order in association with the blockchain upon confirming the transaction order;

sending, by the split-settlement node to the transaction node, a feedback message of successful recording of the transaction order;

receiving, by the split-settlement node from the payment node via the computer network, a payment order created based on a payment record and broadcasted by the payment node to the plurality of blockchain nodes, wherein the payment order comprises information of a payer associated with the transaction order, a payee associated with the transaction order, and an amount paid by the payer to the payee through the payment node;

confirming, by the split-settlement node, the received payment order broadcasted by the payment node;

storing, by the split-settlement node, the payment order in association with the blockchain upon confirming the payment order;

sending, by the split-settlement node to the payment node, a feedback message of successful recording of the payment order;

receiving, by the split-settlement node from the payment node, a fund transfer corresponding to the payment order;

verifying, by the split-settlement node, an amount of the fund transfer received by the split-settlement node from the payment node is consistent with the amount paid by the payer to the payee through the payment node that is included in the payment order stored in association with the blockchain;

performing, by the split-settlement node, a split-settlement operation on the payee based on the amount paid by the payer to the payee through the payment node, wherein the split-settlement operation comprises splitting the transferred fund and transferring the split fund to one or more accounts;

creating, by the split-settlement node, a split-settlement record based on the split-settlement operation; and broadcasting, by the split-settlement node to the plurality of blockchain nodes that include the transaction node and the payment node, the split-settlement record for the transaction node and the payment node to verify the split-settlement record and to synchronize the split-settlement record upon confirmation of verification.

2. The method of claim 1, wherein the blockchain comprises a consortium blockchain.

3. The method of claim 1, further comprising:
creating, by the transaction node, the transaction order based on the transaction record;
signing, by the transaction node, a digest of the transaction order using a private key of the transaction node to obtain a digital signature; and
uploading, by the transaction node, the transaction order and the digital signature to the blockchain for confirmation by the payment node and the split-settlement node.

4. The method of claim 3, wherein the confirming the received transaction order comprises:
decrypting the digital signature using a public key of the transaction node to obtain a first digest;
applying a hash function to the transaction order to obtain a second digest; and
verifying that the transaction order is uploaded by the transaction node to the blockchain if the first digest is consistent with the second digest.

5. The method of claim 1, further comprising:
creating, by the payment node, the payment order based on the payment record;
signing, by the payment node, a digest of the payment order using a private key of the payment node to obtain a digital signature; and
uploading, by the payment node, the payment order and the digital signature to the blockchain for confirmation by the transaction node and the split-settlement node.

6. The method of claim 5, wherein the confirming the received payment order comprises:
decrypting the digital signature using a public key of the payment node to obtain a first digest;
applying a hash function to the payment order to obtain a second digest; and
verifying that the payment order is uploaded by the payment node to the blockchain if the first digest is consistent with the second digest.

7. The method of claim 1, further comprising:
signing, by the split-settlement node, a digest of the split-settlement record using a private key of the split-settlement node to obtain a digital signature; and
uploading, by the split-settlement node, the digital signature to the blockchain.

8. The method of claim 7, further comprising:
verifying, by the transaction node, the split-settlement record based on the digital signature; and
verifying, by the payment node, the split-settlement record based on the digital signature.

9. The method of claim 1, wherein the plurality of blockchain nodes further comprises a regulatory node, and wherein the method further comprises:
confirming, by the regulatory node, at least one of the transaction order, the payment order, or the split-settlement record.

10. A system associated with a split-settlement node for blockchain-based data synchronization implemented in a blockchain having a computer network of a plurality of blockchain nodes, the blockchain nodes comprising a transaction node, a payment node, and the split-settlement node, the system comprising at least one processor and a non-transitory computer-readable storage medium storing instructions executable by the at least one processor to cause the system to perform operations comprising:
receiving, from the transaction node via the computer network, a transaction order created based on a transaction record and broadcasted by the transaction node to the plurality of blockchain nodes;
confirming the received transaction order broadcasted by the transaction node;
storing the transaction order in association with the blockchain upon confirming the transaction order;
sending, to the transaction node, a feedback message of successful recording of the transaction order;
receiving, from the payment node via the computer network, a payment order created based on a payment record and broadcasted by the payment node to the plurality of blockchain nodes, wherein the payment order comprises information of a payer associated with the transaction order, a payee associated with the transaction order, and an amount paid by the payer to the payee through the payment node;
confirming the received payment order broadcasted by the payment node;
storing the payment order in association with the blockchain upon confirming the payment order;
sending, to the payment node, a feedback message of successful recording of the payment order;
receiving, from the payment node, a fund transfer corresponding to the payment order;
verifying an amount of the fund transfer received from the payment node is consistent with the amount paid by the payer to the payee through the payment node that is included in the payment order stored in association with the blockchain;
performing a split-settlement operation on the payee based on the amount paid by the payer to the payee through the payment node, wherein the split-settlement operation comprises splitting the transferred fund and transferring the split fund to one or more accounts;
creating a split-settlement record based on the split-settlement operation; and
broadcasting, to the plurality of blockchain nodes that include the transaction node and the payment node, the split-settlement record for the transaction node and the payment node to verify the split-settlement record and to synchronize the split-settlement record upon confirmation of verification.

11. The system of claim 10, wherein the operations further comprise:
creating, by the transaction node, the transaction order based on the transaction record, wherein the at least one processor comprise the second processor;
signing, by the transaction node, a digest of the transaction order using a private key of the transaction node to obtain a digital signature; and
uploading, by the transaction node, the transaction order and the digital signature to the blockchain for confirmation by the payment node and the split-settlement node.

12. The system of claim 11, wherein the confirming the received transaction order comprises:
decrypting the digital signature using a public key of the transaction node to obtain a first digest;
applying a hash function to the transaction order to obtain a second digest; and
verifying that the transaction order is uploaded by the transaction node to the blockchain if the first digest is consistent with the second digest.

13. The system of claim 10, further comprising:
creating, by the payment node, the payment order based on the payment record, wherein the at least one processor comprise the third processor;

signing, by the payment node, a digest of the payment order using a private key of the payment node to obtain a digital signature; and uploading, by the payment node, the payment order and the digital signature to the blockchain for confirmation by the transaction node and the split-settlement node.

14. The system of claim 13, wherein the confirming the received payment order comprises:

decrypting the digital signature using a public key of the payment node to obtain a first digest;

applying a hash function to the payment order to obtain a second digest; and verifying that the payment order is uploaded by the payment node to the blockchain if the first digest is consistent with the second digest.

15. The system of claim 10, wherein the operations further comprise:

signing a digest of the split-settlement record using a private key of the split-settlement node to obtain a digital signature; and uploading the digital signature to the blockchain.

16. A non-transitory computer-readable storage medium associated with a split-settlement node for blockchain-based data synchronization implemented in a blockchain having a computer network of a plurality of blockchain nodes, the blockchain nodes comprising a transaction node, a payment node, and the split-settlement node, the non-transitory computer-readable storage medium being configured with instructions executable by one or more processors to cause the one or more processors to perform operations comprising:

receiving, from the transaction node via the computer network, a transaction order created based on a transaction record and broadcasted by the transaction node to the plurality of blockchain nodes;

confirming the received transaction order broadcasted by the transaction node;

storing the transaction order in association with the blockchain upon confirming the transaction order;

sending, to the transaction node, a feedback message of successful recording of the transaction order;

receiving, from the payment node via the computer network, a payment order created based on a payment record and broadcasted by the payment node to the plurality of blockchain nodes, wherein the payment order comprises information of a payer associated with the transaction order, a payee associated with the transaction order, and an amount paid by the payer to the payee through the payment node;

confirming the received payment order broadcasted by the payment node;

storing the payment order in association with the blockchain upon confirming the payment order;

sending, to the payment node, a feedback message of successful recording of the payment order;

receiving, from the payment node, a fund transfer corresponding to the payment order;

verifying an amount of the fund transfer received from the payment node is consistent with the amount paid by the payer to the payee through the payment node that is included in the payment order stored in association with the blockchain;

performing a split-settlement operation on the payee based on the amount paid by the payer to the payee through the payment node, wherein the split-settlement operation comprises splitting the transferred fund and transferring the split fund to one or more accounts;

creating a split-settlement record based on the split-settlement operation; and broadcasting, to the plurality of blockchain nodes that include the transaction node and the payment node, the split-settlement record for the transaction node and the payment node to verify the split-settlement record and to synchronize the split-settlement record upon confirmation of verification.

17. The medium of claim 16, wherein the operations further comprise:

creating, by the transaction node, the transaction order based on the transaction record, wherein the at least one processor comprise the second processor;

signing, by the transaction node, a digest of the transaction order using a private key of the transaction node to obtain a digital signature; and uploading, by the transaction node, the transaction order and the digital signature to the blockchain for confirmation by the payment node and the split-settlement node.

18. The system of claim 17, wherein the confirming the received transaction order comprises:

decrypting the digital signature using a public key of the transaction node to obtain a first digest;

applying a hash function to the transaction order to obtain a second digest; and verifying that the transaction order is uploaded by the transaction node to the blockchain if the first digest is consistent with the second digest.

19. The system of claim 16, wherein the operations further comprise:

signing a digest of the split-settlement record using a private key of the split-settlement node to obtain a digital signature; and uploading the digital signature to the blockchain.

20. The system of claim 19, wherein the operations further comprise:

verifying, by the transaction node, the split-settlement record based on the digital signature; and verifying, by the payment node, the split-settlement record based on the digital signature.

* * * * *